Figure 1:
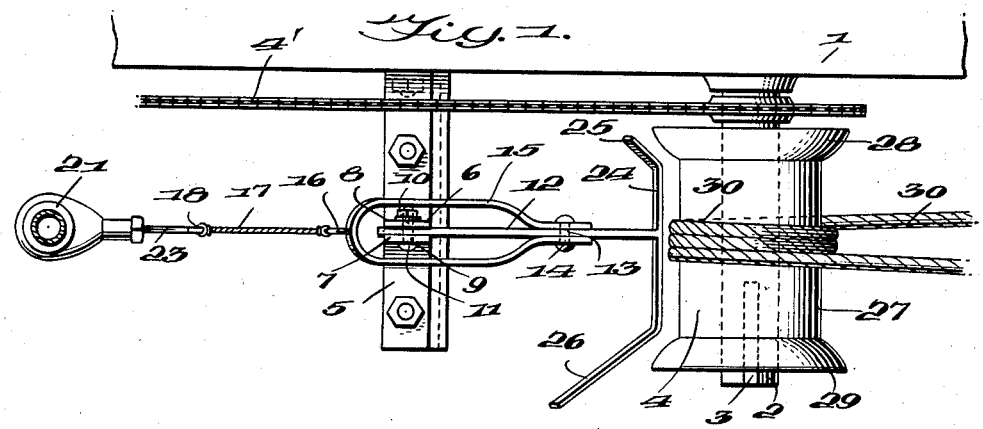

March 12, 1940.  S. D. ROWE  2,193,010
SAFETY DEVICE FOR CATHEADS
Filed Sept. 17, 1938

Inventor
S. D. Rowe,
By Mason + Mason
Attorneys.

Patented Mar. 12, 1940

2,193,010

UNITED STATES PATENT OFFICE 2,193,010

SAFETY DEVICE FOR CATHEADS

Stephen D. Rowe, Wichita Falls, Tex.

Application September 17, 1938, Serial No. 230,503

6 Claims. (Cl. 254—173)

This invention is for a safety device to be used on rotary drilling rigs, and other machinery using catheads.

An object of the invention is to provide a device of this character, which will prevent injuries occasioned when the hand or an article of clothing of an operator becomes entangled in the rope tha is wound around the cathead. Many accidents involving serious injury to oil well workers have been caused by the entanglement of an operator's hand or clothing in the rope as it winds around the cathead.

A further object of the invention is the provision of a safety device which automatically stops the drilling machinery including the cathead driving means, and cathead, whenever an object becomes entangled in the rope which winds around the cathead.

Other objects will appear hereinafter.

Figure 2:
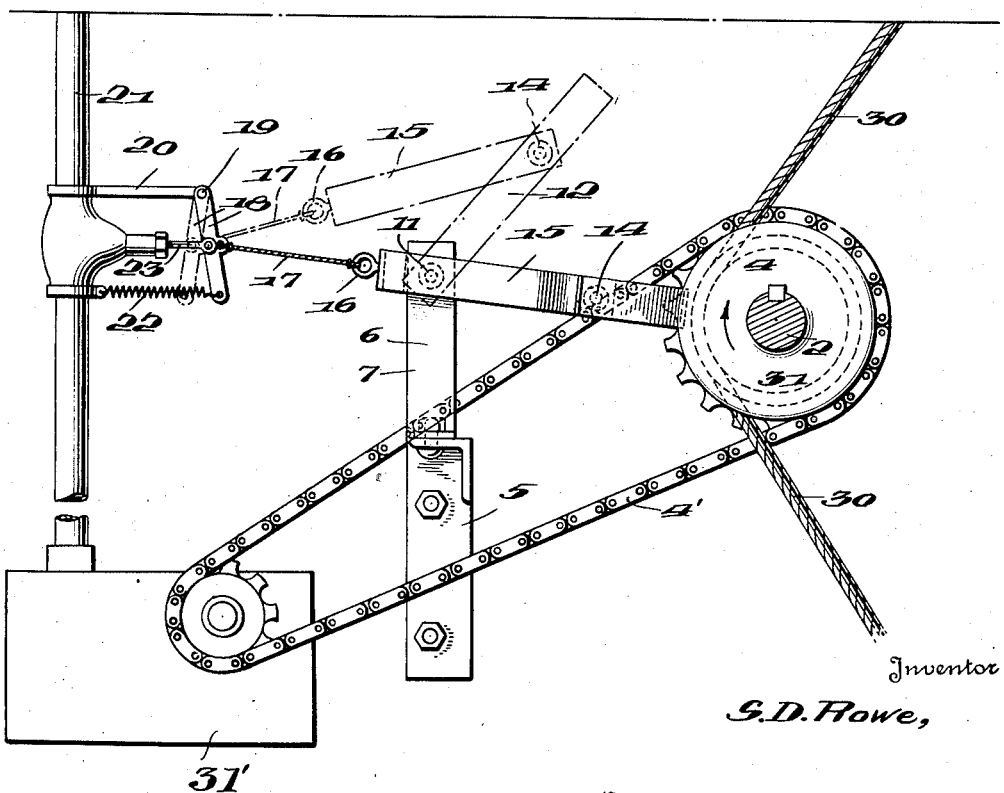

In the drawing:

Figure 1 is a plan view of a device embodying the present invention in position relative to the cathead, and Figure 2 is a side elevation of the device shown in Figure 1, and showing the line shaft upon which the cathead is mounted, in section, and showing in dotted lines the safety device after having been operated.

In the drawing the numeral 1 indicates a part of the supporting framework for the line shaft 2 to which is splined by the feather 3 the cathead 4.

The numeral 5 indicates a suitable support for a rigid stationary pedestal 6 which latter may take the form of a bifurcated member having furcations 7 and 8. These latter are provided with aligned apertures indicated by the numerals 9 and 10 through which extends a bolt 11 which forms a pivot for a movable arm 12.

Intermediate the length of the arm 12 is an aperture 13 through which extends a second pivot bolt 14. This pivot bolt forms a mounting means for a looped strap member 15, the opposite ends of the loop being supported pivotally by the said bolt 14. 16 represents an eye-shaped member which is attached in any suitable manner to the curved end of the strap.

The numeral 17 represents a rod, chain, link or connecting member, one of whose ends is attached to the eye-shaped member, and whose opposite end is attached to an operating member 18. In the example here shown, said operating member is pivotally mounted at 19 to a fixed support 20 which may be attached to any suitable supporting means, such as a pipe 21. The opposite end of the operating member has attached thereto a spring 22 whose other end may be also attached to a fixed support, such as the pipe 21. The numeral 31' indicates a suitable source of power such as a steam engine to which the steam pipe 21 is connected, and this steam engine is adapted to drive in the usual manner the cathead by means of the chain 4'. Attached to the operating member intermediate the length thereof, is a stem 23 which is intended to operate in such manner that when said stem is moved to the left it will cut off the power to a steam engine, motor, or other source of power, not shown.

The parts 12, 15, together with their pivots 14 and 11 form a toggle, which in the full line position shown in Figures 1 and 2, is on dead center, but which when moved to the dotted line position shown in Figure 2, whether the toggle is broken, allows the spring 22 to act to shut off a valve, throw a switch, or otherwise cut off the power to the prime mover which drives the line shaft and cathead. The movable arm 12 is generally of T-shaped formation, in which the arm 12 forms the base and the cross member 24 extends at right angles thereto. The cross member 24 is provided with divergences 25 and 26, so that said cross member when in full line position as shown in the figures will extend close to the outer periphery 27 of the cathead, and between the opposite flanges 28 and 29 thereof. The cross member 24 preferably extends to within a fraction of an inch of the rope 30, which is wound around the cathead. The line shaft 2 is driven by the usual sprocket wheel 31 by means of a chain 4', which is connected to the usual source of power, such as a steam engine.

Operation

Assuming that the parts are in the position shown in the full lines in the figures, and the sprocket wheel is rotated in a clockwise direction, as shown by the arrow in Figure 2: The parts have previously been set to the position of the locked toggle with the cross member spaced a short distance from the coils of rope about the outer periphery of the cathead 27, as best shown in Figure 1. Should the rope become doubled on the cathead, or should a man's hand or glove become caught between the outer periphery of the cathead and the rope, this will increase the outer diameter of the cathead as it rotates, and contact of the rope or other object with the cross member will move the same upwardly, as shown in Figure 2 in dotted lines. As long as connecting member 17 and pivots 11 and 14 are in alignment, the toggle is in a locked position, but as soon as pivot 14 is raised together with arm 12, due to the aforesaid engagement of rope 30, or other object, with the cross member, the toggle is broken and immediately spring 22 actuates the stem 23 and moves the same to the left to close a valve, actuate a switch, etc., thus, immediately stopping the rotation of the cathead and preventing injury to the operator whose hand, glove, or other article of clothing may have become entangled between the cathead and the rope which is wound thereabout.

It will be readily appreciated that this invenion is not restricted to the control of any particular type of motive power, and that the stem 23 may as readily operate a switch or other control means of an internal combustion engine, or electric motor, as operate the valve of a steam engine, or other power means, which drives the cathead, and other parts of a well drilling apparatus.

It will be further understood that the drawing and description illustrate one embodiment of my invention, and that I desire to be limited in the practice of my invention, only to the extent as set forth in the appended claims.

I claim:

1. In a safety device for a rotary cathead, the combination with a source of motive power, a control means for said motive power, a rotary cathead driven by said motive power, a toggle connected to said control means including a member located adjacent to said cathead, another member forming part of said toggle pivotally connected to said first member, and normally in line therewith and connected to said control means, said first member being adapted when actuated to break said toggle and actuate said control means to stop operation of said source of motive power of said rotary cathead.

2. In a safety device for a rotary cathead, the combination with a source of motive power, a control means for said motive power, a rotary cathead driven by said motive power, biased means tending to operate said control means, and a toggle having pivotally connected members in overlapping relation to each other and normally in line with each other, one of said members having a connection to said biasing means, and another of said overlapping members having a part thereof located adjacent said cathead, said toggle when broken by operation of said part permitting said biasing means to actuate said control means to stop the operation of the said source of power and said rotary cathead.

3. In a safety device for a rotary cathead, the combination with a source of motive power, a control means for said motive power, a rotary cathead driven by said motive power, a toggle including a support, a pivot on said support, a movable arm pivoted to said support, said movable arm having means extending adjacent to said cathead, said toggle additionally including means pivotally attached intermediate the ends of said movable arm, and means connected to said pivotally attached means and to said control means, whereby when said movable arm is actuated said control means is actuated to stop operation of said source of motive power and said rotary cathead.

4. In a safety device for a rotary cathead, the combination with a source of motive power, a control means for said motive power, a rotary cathead driven by said motive power, a toggle including a support, a pivot on said support, a movable arm pivoted to said support extending adjacent to said cathead, said toggle means further including a looped member pivotally attached intermediate the ends of said movable arm, said looped member having means connecting the same to said control means whereby said arm when actuated will break said toggle and actuate said control means to stop operation of said source of motive power and said rotary cathead.

5. In a safety device for a rotary cathead, the combination with a source of motive power, a control means for said motive power, a rotary cathead driven by said motive power, said safety device including an arm, a support, means for pivotally mounting said arm on said support, one end of said arm being located adjacent to said cathead, a second pivot extending through said arm between said first pivot and the end of said arm, a strap member pivotally attached to the second named pivot and surrounding said first named pivot when in one position, means for connecting said strap to said control means and adapted when said arm is operated to actuate said control means to stop operation of said source of motive power and said rotary cathead.

6. In a safety device for a rotary cathead, the combination with a source of motive power, a control means for said motive power means for actuating said control means including a spring, a rotary cathead driven by said motive power, a toggle having a plurality of pivoted members and adapted when in line with each other to prevent operation of said spring control means, one of said members having an end extending adjacent to said cathead a support for the opposite end and another of said members being pivotally attached to said first member and also attached to said control means, said adjacent member when actuated being adapted to break said toggle and permit said spring actuating means to operate said control means to stop operation of said source of motive power and said rotary cathead.

STEPHEN D. ROWE.